United States Patent
Kanoya et al.

(10) Patent No.: US 7,637,389 B2
(45) Date of Patent: Dec. 29, 2009

(54) APPARATUS FOR AND METHOD OF FILLING HYDROGEN TANK WITH HYDROGEN

(75) Inventors: Izuru Kanoya, Iruma-gun (JP); Mitsuya Hosoe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 11/605,759

(22) Filed: Nov. 29, 2006

(65) Prior Publication Data

US 2007/0257043 A1    Nov. 8, 2007

(30) Foreign Application Priority Data

Nov. 29, 2005    (JP)    ............................. 2005-344290

(51) Int. Cl.
*F17C 1/00*    (2006.01)
*B65B 31/00*    (2006.01)
*B65B 1/28*    (2006.01)
*B62D 33/00*    (2006.01)
*G08B 21/00*    (2006.01)

(52) U.S. Cl. ...................... 220/581; 340/612; 220/562; 141/82

(58) Field of Classification Search ................. 220/581, 220/562; 340/612; 141/4, 82
See application file for complete search history.

(56) References Cited

U.S. PATENT DOCUMENTS 5,409,676 A * 4/1995 Nasako et al. ............... 422/200

FOREIGN PATENT DOCUMENTS

| DE | 10021681 A1 | 11/2001 |
|---|---|---|
| DE | 10247505 A1 | 5/2004 |
| EP | 1180637 A2 | 2/2002 |
| EP | 1593905 A2 | 11/2005 |
| JP | 2005-069332 | 3/2005 |
| WO | WO-02/064395 A2 | 8/2002 |

OTHER PUBLICATIONS

European Search Report for Application No. 06256061.0-2425, dated Apr. 24, 2007.

* cited by examiner

*Primary Examiner*—Jennifer K Michener
*Assistant Examiner*—Imran Akram
(74) *Attorney, Agent, or Firm*—Lahive & Cockfield, LLP; Anthony A. Laurentano, Esq.

(57) ABSTRACT

An hydrogen tank filling apparatus includes a first hydrogen supply pipe for supplying hydrogen substantially at an atmospheric temperature from a high-pressure hydrogen storage tank to a hydrogen tank, a second hydrogen supply pipe for supplying cooled hydrogen from the high-pressure hydrogen storage tank to the hydrogen tank, and an internal tank temperature measuring unit for measuring the temperature inside the hydrogen tank. The first hydrogen supply pipe and the second hydrogen supply pipe are selectively switched by a control unit, depending on changes in the temperature inside the hydrogen tank.

5 Claims, 5 Drawing Sheets

APPARATUS FOR AND METHOD OF FILLING HYDROGEN TANK WITH HYDROGEN

BACKGROUND OF THE INVENTION

1. Field of the Invention

The present invention relates to an apparatus and method for filling a hydrogen tank with hydrogen.

2. Description of the Related Art

Generally, a fuel cell, which generates electrical energy by an electrochemical reaction between hydrogen and oxygen, is supplied with hydrogen as a fuel from a hydrogen tank, which is located near the fuel cell and which stores hydrogen under a high pressure. When the amount of hydrogen that is stored in the hydrogen tank decreases, the hydrogen tank is connected to a high-pressure hydrogen storage tank, which stores hydrogen under a pressure higher than the hydrogen tank. Thus, the hydrogen tank is replenished with hydrogen supplied from the high-pressure hydrogen storage tank.

It is known in the art that when the hydrogen tank is filled with high-pressure hydrogen from the high-pressure hydrogen storage tank, the hydrogen inside the filled hydrogen tank generates heat. The temperature inside the hydrogen tank immediately after filling the hydrogen tank is higher than the ambient temperature, and is +70° C. or higher, for example. An increased pressure of hydrogen inside the hydrogen tank immediately after filling the hydrogen tank also develops at the high temperature, due to the rise in temperature. Thereafter, when the temperature inside the hydrogen tank drops, so as to be near to the atmospheric temperature, the pressure of hydrogen inside the hydrogen tank also drops to a level that is lower than the hydrogen pressure immediately after completion of filling the hydrogen tank. When the above temperature rise occurs, therefore, the filled hydrogen tank is likely to suffer a shortage of hydrogen.

Japanese Laid-Open Patent Publication No. 2005-69332 discloses, as a method of reducing a temperature rise in the hydrogen tank when thus-filling a hydrogen tank with hydrogen, a hydrogen supply station having a supply pipe for supplying hydrogen to a hydrogen tank on a vehicle from a plurality of high-pressure hydrogen storage tanks, which store the hydrogen under a plurality of different pressure stages. The hydrogen supply station also has a cooling means disposed within the supply pipe for cooling hydrogen as it flows through the supply pipe. The temperature inside the hydrogen tank is detected for enabling a feedback control. The hydrogen tank is filled with hydrogen, which is cooled by the cooling means, depending on the detected temperature inside the hydrogen tank.

According to the disclosed hydrogen supply station, the cooling means is disposed inside the hydrogen supply pipe, and the temperature inside the hydrogen tank is monitored and detected to enable feedback control, so as to cause the cooling means to initiate cooling of hydrogen dependent on the detected temperature. Consequently, a considerable time elapses after it is determined that the interior of the hydrogen tank needs to be cooled and until the hydrogen tank is filled sufficiently with cooled hydrogen. If the temperature inside the hydrogen tank is lowered excessively by the cooled hydrogen supplied thereto, then it is necessary to stop operation of the cooling means, and thereafter, to supply hydrogen at the atmospheric temperature to the hydrogen tank. It is quite time-consuming to fill the hydrogen tank with hydrogen at the atmospheric temperature. Therefore, the conventional hydrogen supply station is disadvantageous in that the temperature of the hydrogen used to fill the hydrogen tank is not highly responsive to temperature increases and decreases inside the hydrogen tank as it is being filled. Thus, the hydrogen tank cannot be filled with hydrogen while responding quickly to temperature changes inside the hydrogen tank.

SUMMARY OF THE INVENTION

It is a general object of the present invention to provide an apparatus and method for quickly filling a hydrogen tank with hydrogen at temperatures that are suitable for suppressing temperature changes inside the hydrogen tank as it is being filled.

A major object of the present invention is to provide an apparatus and method for filling a hydrogen tank with hydrogen, which holds the interior of the hydrogen tank substantially at the atmospheric temperature immediately after completion of filling the hydrogen tank, while also ensuring that the hydrogen tank is filled with a sufficient amount of hydrogen.

According to an aspect of the present invention, there is provided an apparatus for filling a hydrogen tank with hydrogen, comprising a switching means for selectively supplying hydrogen to the hydrogen tank at a first temperature from a first hydrogen storage unit, and supplying hydrogen to the hydrogen tank at a second temperature lower than the first temperature from a second hydrogen storage unit, a temperature measuring means for measuring a temperature inside the hydrogen tank, and a control means for controlling the switching means depending on the temperature inside the hydrogen tank as measured by the temperature measuring means.

With the above arrangement, the hydrogen tank is selectively supplied with hydrogen at the first temperature and hydrogen at the second temperature. The hydrogen tank can thus be quickly supplied with a sufficient amount of hydrogen, wherein the hydrogen is at temperatures suitable for suppressing temperature changes inside the hydrogen tank.

The hydrogen tank filling apparatus may further comprise a cooling means for cooling the hydrogen inside the second hydrogen storage unit, so that the hydrogen tank can be supplied with hydrogen from the second hydrogen storage unit, which has been cooled sufficiently.

According to another aspect of the present invention, there is also provided an apparatus for filling a hydrogen tank with hydrogen, comprising a high-pressure hydrogen storage unit, a first hydrogen supply pipe for supplying hydrogen at a first temperature from the high-pressure hydrogen storage unit to the hydrogen tank, a second hydrogen supply pipe for supplying hydrogen at a second temperature lower than the first temperature from the high-pressure hydrogen storage unit to the hydrogen tank, a temperature measuring means for measuring a temperature inside the hydrogen tank, a switching means for selectively switching between the first hydrogen supply pipe and the second hydrogen supply pipe, and a control means for controlling the switching means depending on the temperature inside the hydrogen tank as measured by the temperature measuring means.

With the above arrangement, the hydrogen tank can quickly be supplied with a sufficient amount of hydrogen from the first hydrogen supply pipe and the second hydrogen supply pipe at temperatures suitable for suppressing temperature changes inside the hydrogen tank.

The hydrogen tank filling apparatus may further comprise a cooling means, which is connected to the second hydrogen supply pipe, for cooling the hydrogen inside the second hydrogen supply pipe, and a thermal insulating means for thermally insulating a portion of the second hydrogen supply pipe, which extends from the cooling means to the hydrogen tank. The hydrogen tank can thus be supplied with sufficiently cooled hydrogen from the second hydrogen supply pipe.

If the switching means comprises a first valve connected to the first hydrogen supply pipe and a second valve connected to the second hydrogen supply pipe at an outlet of the cooling means, then the control means can open and close the first and second valves. Therefore, the hydrogen tank filling apparatus constructed in this manner is of a relatively simple structure.

The first hydrogen supply pipe and the second hydrogen supply pipe may be connected to each other at ends thereof that are connected to the hydrogen tank, such that the first hydrogen supply pipe and the second hydrogen supply pipe have a common outlet at the ends thereof. Preferably, the first hydrogen supply pipe and the second hydrogen supply pipe may be combined with each other by means of a covering sleeve. With this arrangement, the combined supply pipe assembly can easily be handled for better efficiency when the hydrogen tank is filled with hydrogen.

According to still another aspect of the present invention, there is provided a method of filling a hydrogen tank with hydrogen, comprising the steps of supplying hydrogen at a first temperature to the hydrogen tank, supplying hydrogen at a second temperature lower than the first temperature to the hydrogen tank, measuring a temperature inside the hydrogen tank with a temperature measuring means as the hydrogen tank is being filled with hydrogen, and selectively supplying the hydrogen at the first temperature and at the second temperature depending on the measured temperature, to fill the hydrogen tank.

According to the above method, the hydrogen tank is selectively supplied with hydrogen at the first temperature and at the second temperature. The hydrogen tank can quickly be supplied with a sufficient amount of hydrogen at temperatures suitable for suppressing temperature changes inside the hydrogen tank.

Preferably, the step of selectively supplying the hydrogen may comprise the steps of supplying the hydrogen at the first temperature to fill the hydrogen tank if the temperature inside the hydrogen tank is lower than a predetermined temperature, and supplying the hydrogen at the second temperature to fill the hydrogen tank if the temperature inside the hydrogen tank is higher than the predetermined temperature. Thus, the hydrogen tank can be filled with a desired amount of hydrogen while the temperature inside the hydrogen tank is maintained in the vicinity of a desired temperature.

The method may further comprise the step of measuring an atmospheric temperature with an atmospheric temperature measuring means, wherein the step of selectively supplying the hydrogen further comprises the steps of supplying the hydrogen at the first temperature to fill the hydrogen tank if the difference between the temperature inside the hydrogen tank and the atmospheric temperature is lower than a predetermined temperature range, and supplying the hydrogen at the second temperature to fill the hydrogen tank if the difference between the temperature inside the hydrogen tank and the atmospheric temperature is higher than a predetermined temperature range. With this arrangement, immediately after completion of filling the hydrogen tank, the interior of the hydrogen tank can be kept substantially at the atmospheric temperature, while ensuring that the hydrogen tank is filled with a sufficient amount of hydrogen.

If the hydrogen at the second temperature is supplied to fill the hydrogen tank upon beginning to fill the hydrogen tank, then it is possible to avoid a temperature rise from occurring in the hydrogen tank immediately after the hydrogen tank starts to be filled.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A hydrogen tank filling apparatus according to an embodiment of the present invention, and hydrogen tank filling methods carried out by the hydrogen tank filling apparatus, will be described in detail below with reference to the accompanying drawings.

Figure 1:
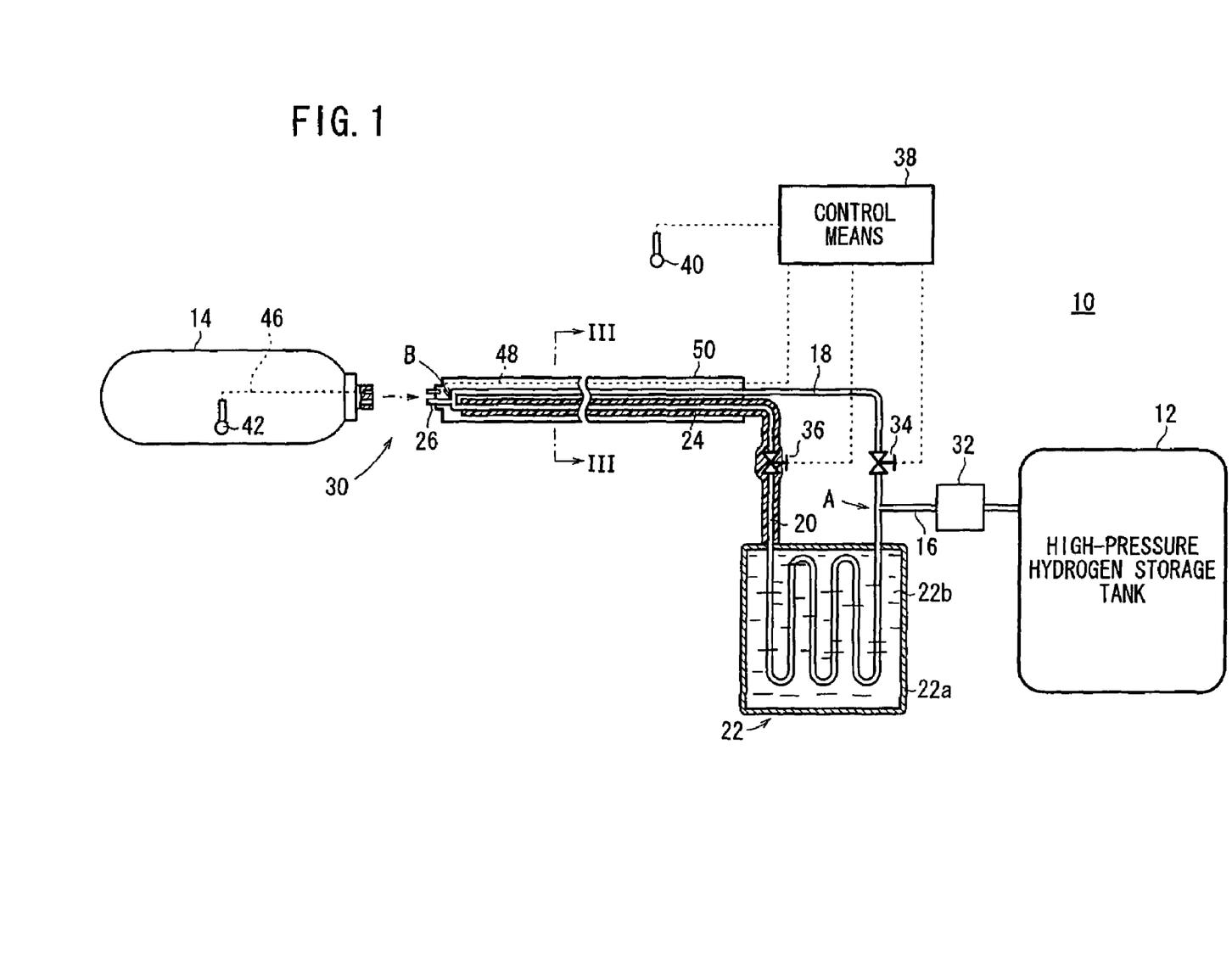
FIG. 1 is a view, partly in cross section, of a hydrogen tank filling apparatus according to an embodiment of the present invention.

As shown in FIG. 1, a hydrogen tank filling apparatus 10 according to an embodiment of the present invention serves to supply hydrogen from a high-pressure hydrogen storage tank 12, which is a high-pressure hydrogen storage unit for storing hydrogen under a high pressure, to a hydrogen tank 14, which stores hydrogen under a pressure lower than that of the high-pressure hydrogen storage tank 12. The hydrogen tank 14 stores and supplies hydrogen as a fuel gas to a fuel cell, for generating electrical energy by an electrochemical reaction between hydrogen and oxygen. The hydrogen tank 14 may be of any structure capable of storing hydrogen, e.g., a tank for storing hydrogen under high pressure, a tank containing a hydrogen storage alloy for storing and discharging hydrogen, or a tank containing a hydrogen adsorbing material for adsorbing and discharging hydrogen, such as, for example, a complex, activated carbon, carbon nanotubes, amorphous carbon, graphite carbon, zeolite, or mesoporous silicate.

The hydrogen tank filling apparatus 10 includes the high-pressure hydrogen storage tank 12 for storing under a high pressure hydrogen that is to be supplied to fill the hydrogen tank 14, a hydrogen supply pipe 16 supplied with hydrogen from the high-pressure hydrogen storage tank 12, a first hydrogen supply pipe 18, which branches from the hydrogen supply pipe 16 at a branch point A, a second hydrogen supply pipe 20, which also branches from the hydrogen supply pipe 16 at the branch point A, and a cooling means 22 for cooling the hydrogen inside the second hydrogen supply pipe 20. The second hydrogen supply pipe 20 has a portion through which the hydrogen cooled by the cooling means 22 flows, the portion being thermally insulated by a thermal insulator 24. The first hydrogen supply pipe 18 and the second hydrogen supply pipe 20 are joined to each other at respective ends thereof at a joint point B, so as to be connected to the hydrogen tank 14. At the joint point B, a hydrogen supply pipe 26 is connected to the respective ends of the first hydrogen supply pipe 18 and the second hydrogen supply pipe 20 (see FIG. 2). That is, the first hydrogen supply pipe 18 and the second hydrogen supply pipe 20 have a common outlet at their respective ends. The hydrogen supply pipe 26 is connected to the hydrogen tank 14 at a joint region 30, as shown in FIG. 1.

The cooling means 22 may be of any structure capable of sufficiently cooling the hydrogen inside the second hydrogen supply pipe 20. In the illustrated embodiment, the cooling means 22 comprises a container 22a, which is filled with liquid nitrogen 22b at all times. The second hydrogen supply pipe 20 has another portion extending in a meandering pattern within the container 22a. Hydrogen flowing through the meandering portion of the second hydrogen supply pipe 20 is cooled in the container 22a by the liquid nitrogen 22b. Alternatively, the cooling means 22 may comprise a refrigerator, not shown, rather than the container 22a filled with liquid nitrogen 22b. Further, alternatively, the cooling unit of a refrigerator, not shown, may be immersed in the liquid nitrogen 22b in order to prevent evaporation of the liquid nitrogen 22b.

The thermal insulator 24 serves to prevent a rise in temperature of the hydrogen that has been cooled by the cooling means 22, and also to prevent frosting and dew condensation from occurring on an outer wall surface of the second hydrogen supply pipe 20, through which the cooled hydrogen flows. The thermal insulator 24 comprises a thermal insulating material such as glass wool, rock wool, or a foamed plastic material wound around the outer wall surface of the second hydrogen supply pipe 20. Alternatively, the thermal insulator 24 may comprise a double-walled structure for the second hydrogen supply pipe 20, in which an inner pipe is provided for passage of hydrogen therethrough, and an outer pipe is provided having a vacuum developed therein or through which liquid nitrogen passes.

The hydrogen tank filling apparatus 10 also includes a regulator 32 connected to the hydrogen supply pipe 16 for reducing the pressure of hydrogen supplied from the high-pressure hydrogen storage tank 12 to a predetermined pressure level, a first valve 34 comprising, for example, a solenoid-operated on-off valve connected to the first hydrogen supply pipe 18, and a second valve 36 comprising, as with the first valve 34, a solenoid-operated on-off valve connected to the second hydrogen supply pipe 20 at an outlet of the cooling means 22. The first valve 34 and the second valve 36 operate as switching means, which can be opened and closed for selectively switching between the first hydrogen supply pipe 18 and the second hydrogen supply pipe 20, under the control of a control means 38. The first valve 34 and the second valve 36 are electrically connected to the control means 38, and can selectively be opened and closed by the control means 38. The control means 38 is electrically connected to an atmospheric temperature measuring means 40 placed in the atmosphere, as well as to an internal tank temperature measuring means 42 disposed as a temperature measuring means inside of the hydrogen tank 14. Depending on detected temperatures from the atmospheric temperature measuring means 40 and the internal tank temperature measuring means 42, the control means 38 selectively opens and closes the first valve 34 and the second valve 36. Each of the atmospheric temperature measuring means 40 and the internal tank temperature measuring means 42 may comprise a thermocouple, for example.

Figure 2:
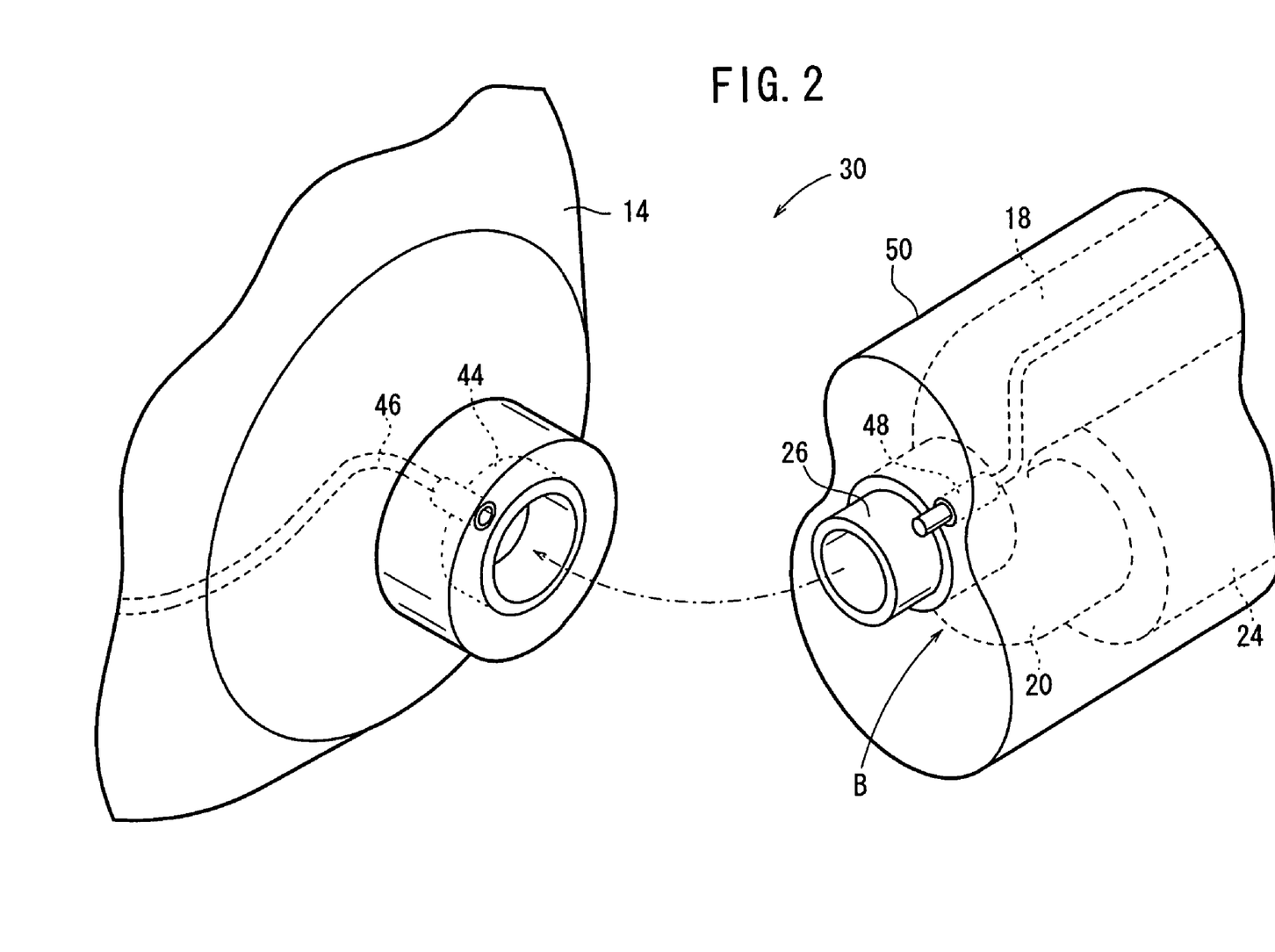
FIG. 2 is an enlarged fragmentary perspective view of a joint region of the hydrogen tank filling apparatus shown in FIG. 1.

The joint region 30 shall be described in detail below with reference to FIG. 2. The joint region 30 defines a region where the high-pressure hydrogen storage tank 12 and the hydrogen tank 14 are detachably connected to each other, as shown in FIG. 2.

In the joint region 30, the hydrogen tank 14 has a supply port 44 through which the hydrogen tank 14 is filled with hydrogen, and a conducting wire 46 for transmitting a signal representative of the temperature measured by the internal tank temperature measuring means 42 to the control means 38. The conducting wire 46 has a tubular terminal positioned near the supply port 44. On the side of the high-pressure hydrogen storage tank 12, the hydrogen supply pipe 26 that is connected to the first hydrogen supply pipe 18 and the second hydrogen supply pipe 20 at the joint point B, and a conducting wire 48 for transmitting the signal from the conducting wire 46 to the control means 38, are covered by a covering sleeve 50. The conducting wire 48 has a protruding terminal positioned near the hydrogen supply pipe 26. In the joint region 30, the hydrogen supply pipe 26 and the protruding terminal of the conducting wire 48 are inserted respectively into and detachably connected to the support port 44 and to the tubular terminal of the conducting wire 48. The supply port 44 and the hydrogen supply pipe 26 are securely joined to each other by a joint structure, such as a coupler or the like, for protection against hydrogen leakage. Incidentally, shapes of the conducting wires 46, 48 are not limited to the illustrated embodiment.

Figure 3:
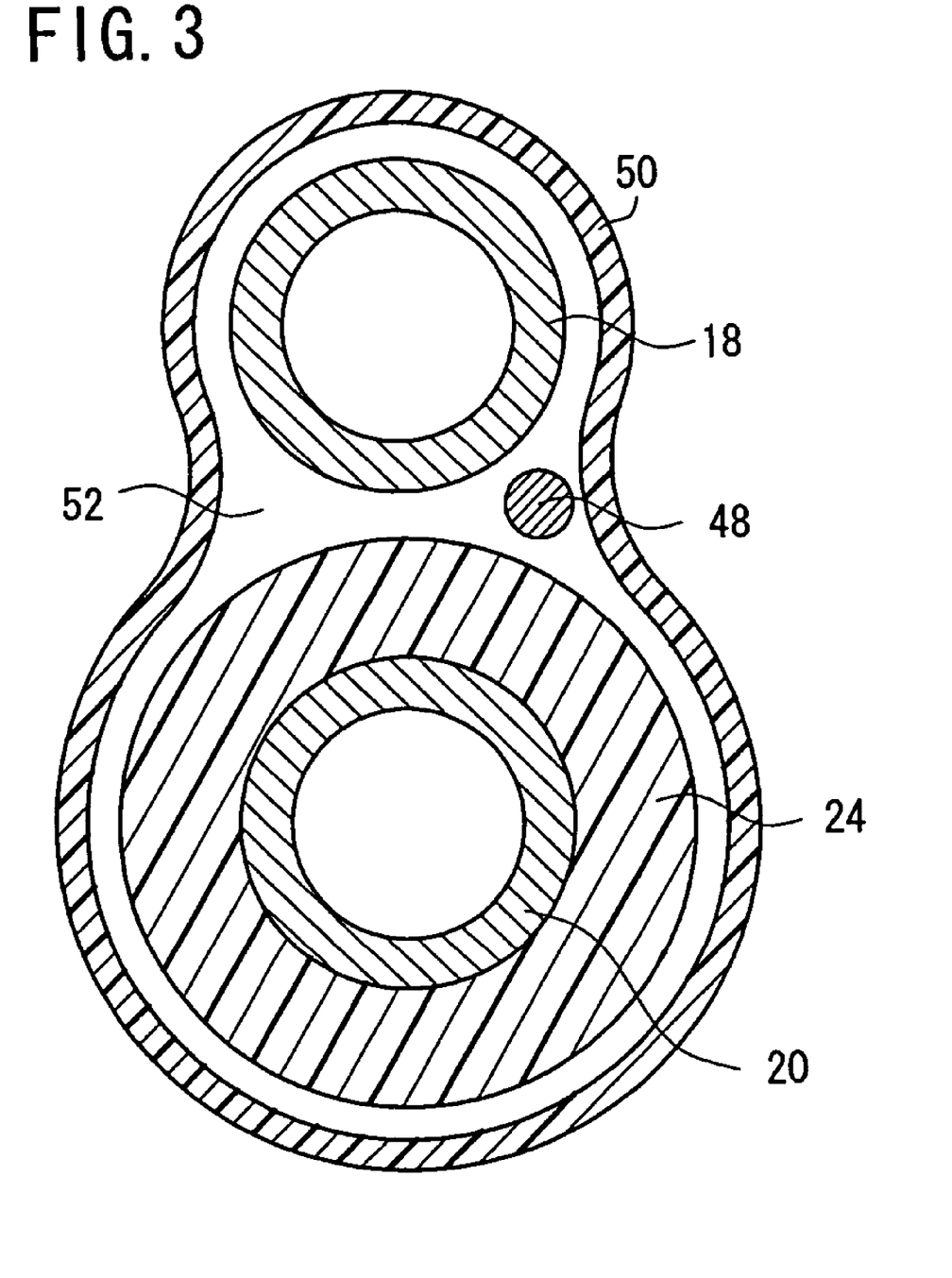
FIG. 3 is a cross-sectional view taken along line III-III of FIG. 1.

As shown in FIG. 1, the first hydrogen supply pipe 18 and the second hydrogen supply pipe 20 are combined with each other by the covering sleeve 50, downstream of (i.e., on a secondary side of) the first valve 34 and the second valve 36. FIG. 3 is a cross-sectional view taken along line III-III of FIG. 1, showing the first hydrogen supply pipe 18 and the second hydrogen supply pipe 20, which are combined with each other by the covering sleeve 50. As shown in FIG. 3, the first hydrogen supply pipe 18 and the second hydrogen supply pipe 20, which is thermally insulated by the thermal insulator 24, are disposed adjacent to each other and covered with the covering sleeve 50. The conducting wire 48 is disposed within the covering sleeve 50, in a gap 52 between the first hydrogen supply pipe 18 and the second hydrogen supply pipe 20.

The covering sleeve 50 may be made of a plastic material such as polyethylene, polyvinyl chloride, polytetrafluoroethylene, or the like. The covering sleeve 50 preferably comprises a flexible tube.

According to the present embodiment, the hydrogen tank 14 and the high-pressure hydrogen storage tank 12 are joined to each other within the single joint region 30. Therefore, the hydrogen tank 14 does not require a plurality of supply ports connected respectively to the first hydrogen supply pipe 18 and the second hydrogen supply pipe 20, and hence, the hydrogen tank 14 is relatively simple in structure. Furthermore, the first hydrogen supply pipe 18 and the second hydrogen supply pipe 20 are combined with each other through the covering sleeve 50. Consequently, hydrogen is supplied from the high-pressure hydrogen storage tank 12 to the hydrogen tank 14 through a single pipe assembly, which can easily and efficiently be handled when the hydrogen tank 14 is filled with hydrogen.

Basic operations of the hydrogen tank filling apparatus 10 thus constructed shall be described below.

Before the hydrogen tank 14 is connected to the high-pressure hydrogen storage tank 12 through the joint region 30, both the first valve 34 and the second valve 36 are closed. Hydrogen supplied from the high-pressure hydrogen storage tank 12, which has been depressurized by the regulator 32, fills the portion of the first hydrogen supply pipe 18 that lies upstream of, i.e., on a primary side of, the first valve 34, and also fills the portion of the second hydrogen supply pipe 20 that lies upstream of, i.e., on a primary side of, the second valve 36. Hydrogen that is present in the portion of the second hydrogen supply pipe 20 on the primary side of the second valve 36 is sufficiently cooled by the cooling means 22.

When the hydrogen tank 14 is connected to the high-pressure hydrogen storage tank 12 through the joint region 30, either one of the first valve 34 or the second valve 36 is opened to initiate filling of the hydrogen tank 14 with hydrogen. A mode of operation of the hydrogen tank filling apparatus 10, in which the second valve 36 is initially opened, and another mode of operation of the hydrogen tank filling apparatus 10, in which the first valve 34 is initially opened, shall be described below.

First, the mode of operation of the hydrogen tank filling apparatus 10, in which the second valve 36 is initially opened, shall be described below.

When the hydrogen tank 14 begins being filled with hydrogen, the hydrogen tank 14 is filled with hydrogen at a low temperature, which is also referred to as a second temperature, supplied from the second hydrogen supply pipe 20 that is cooled by the cooling means 22. The low-temperature hydrogen, which is supplied to the hydrogen tank 14, remains cooled by the thermal insulator 24 without undergoing any substantial rise in temperature. Therefore, the temperature inside the hydrogen tank 14 is gradually lowered.

When the temperature inside the hydrogen tank 14 drops below a predetermined temperature, or when the difference between the temperature in the hydrogen tank 14 and the atmospheric temperature drops below a predetermined temperature range, the second valve 36 is closed and at the same time the first valve 34 is opened. The hydrogen supplied to the hydrogen tank 14 immediately switches from the hydrogen in the second hydrogen supply pipe 20 to the hydrogen in the first hydrogen supply pipe 18. The hydrogen tank 14 is now quickly supplied with hydrogen, which is substantially at the atmospheric temperature, from the first hydrogen supply pipe 18.

Thereafter, when the temperature in the hydrogen tank 14 increases above a predetermined temperature, or when the difference between the temperature in the hydrogen tank 14 and the atmospheric temperature increases above a predetermined temperature range, due to the hydrogen at the atmospheric temperature supplied from the first hydrogen supply pipe 18, the first valve 34 is closed and at the same time the second valve 36 is opened. Thus, the hydrogen supplied to the hydrogen tank 14 immediately switches from the hydrogen in the first hydrogen supply pipe 18 to the hydrogen in the second hydrogen supply pipe 20. The hydrogen tank 14 is now quickly supplied with hydrogen, which is cooled by the cooling means 22, from the second hydrogen supply pipe 20. The above cycle of operation is repeated until the hydrogen pressure in the hydrogen tank 14 reaches a predetermined pressure.

Another mode of operation of the hydrogen tank filling apparatus 10, in which the first valve 34 is initially opened, shall be described below.

When the hydrogen tank 14 begins being filled with hydrogen, the hydrogen tank 14 is filled with hydrogen substantially at the atmospheric temperature, which is also referred to as a first temperature, supplied from the first hydrogen supply pipe 18. Therefore, the temperature in the hydrogen tank 14 gradually increases. When the temperature in the hydrogen tank 14 increases above a predetermined temperature, or when the difference between the temperature in the hydrogen tank 14 and the atmospheric temperature increases above a predetermined temperature range, the first valve 34 is closed and at the same time the second valve 36 is opened. The hydrogen supplied to the hydrogen tank 14 immediately switches from the hydrogen in the first hydrogen supply pipe 18 to the hydrogen in the second hydrogen supply pipe 20. The hydrogen tank 14 is now quickly supplied with hydrogen, which is cooled by the cooling means 22, from the second hydrogen supply pipe 20. The hydrogen, which is supplied to the hydrogen tank 14, remains cooled by the thermal insulator 24 without undergoing any substantial rise in temperature.

Thereafter, when the temperature in the hydrogen tank 14 drops below a predetermined temperature, or when the difference between the temperature in the hydrogen tank 14 and the atmospheric temperature drops below a predetermined temperature range, due to the cooled hydrogen being supplied from the second hydrogen supply pipe 20, the second valve 36 is closed and at the same time the first valve 34 is opened. The hydrogen supplied to the hydrogen tank 14 immediately switches from the hydrogen in the second hydrogen supply pipe 20 to the hydrogen in the first hydrogen supply pipe 18. The hydrogen tank 14 is now quickly supplied with hydrogen substantially at the atmospheric temperature from the first hydrogen supply pipe 18. The above cycle of operation is repeated until the hydrogen pressure in the hydrogen tank 14 reaches a predetermined pressure.

With the hydrogen tank filling apparatus 10 according to the present embodiment, filling of the hydrogen tank 14 with the hydrogen supplied substantially at the atmospheric temperature from the first hydrogen supply pipe 18, and filling of the hydrogen tank 14 with the hydrogen that is cooled by the cooling means 22 and supplied from the second hydrogen supply pipe 20, are quickly switched depending on temperature changes inside the hydrogen tank 14. Such quick switching allows the hydrogen tank 14 to be immediately filled with hydrogen at temperatures suitable for suppressing temperature increases or decreases inside the hydrogen tank 14 as the hydrogen tank 14 is being filled. Consequently, immediately after completion of filling the hydrogen tank 14, the interior of the hydrogen tank 14 can be kept substantially at the atmospheric temperature, while ensuring that the hydrogen tank 14 is filled with a sufficient amount of hydrogen.

Figure 4:
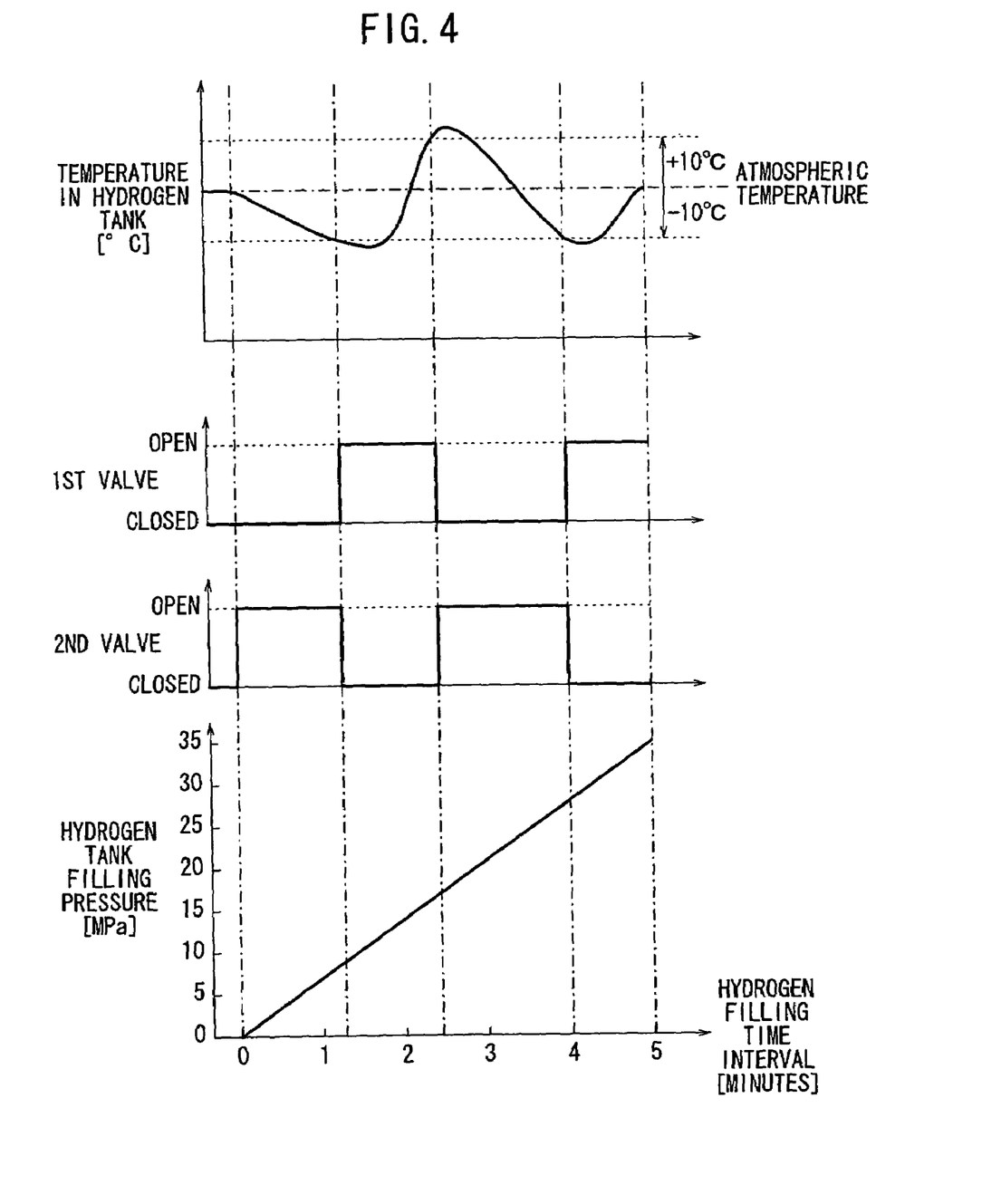
FIG. 4 is a diagram showing temperature and pressure changes in a hydrogen tank and opening and closing times of first and second valves during a hydrogen tank filling time interval, in a first hydrogen tank filling method, in which the second valve is initially opened, according to the present invention.
Figure 5:
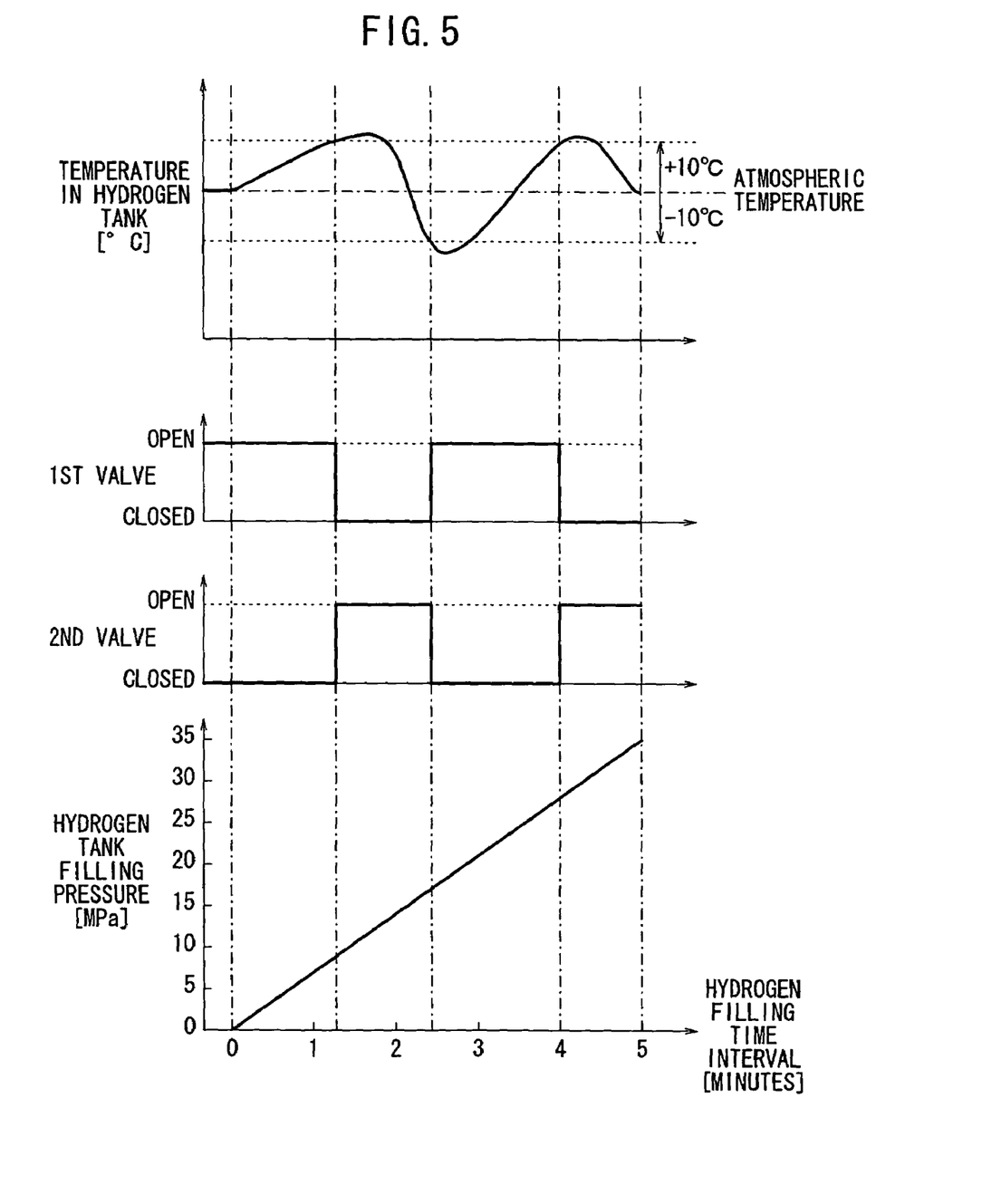
FIG. 5 is a diagram showing temperature and pressure changes in a hydrogen tank and opening and closing times of first and second valves during a hydrogen tank filling time interval, in a second hydrogen tank filling method, in which the first valve is initially opened, according to the present invention.

Methods of filling the hydrogen tank 14 with hydrogen using the hydrogen tank filling apparatus 10 shall be described below with reference to FIGS. 4 and 5, although it is to be noted that the present invention is not limited to the methods shown in FIGS. 4 and 5. FIGS. 4 and 5 show changes in the temperature (° C.) and the pressure (MPa) inside the hydrogen tank 14, and times at which the first and second valves 34, 36 are opened and closed, during a hydrogen tank filling time interval (in minutes) when the hydrogen tank 14 is filled with hydrogen according to first and second hydrogen tank filling methods. In FIG. 4, the second valve 36 is opened earlier than the first valve 34 when the hydrogen tank 14 begins to be filled with hydrogen (first hydrogen tank filling method). In FIG. 5, the first valve 34 is opened earlier than the second valve 36 when the hydrogen tank 14 begins to be filled with hydrogen (second hydrogen tank filling method).

According to the first and second hydrogen tank filling methods, hydrogen that is stored under a pressure of 42 MPa in the high-pressure hydrogen storage tank 12 is depressurized by the regulator 32, so that the hydrogen tank 14 is filled with hydrogen under a pressure of 35 MPa, wherein it takes about 5 minutes to fill the hydrogen tank 14 with hydrogen. The container 22a of the cooling means 22 comprises a stainless steel container, which stores liquid nitrogen 22b at a temperature of about −196° C. The thermal insulator 24 comprises a thermal insulating material of glass wool, which is wound around an outer wall surface of the second hydrogen supply pipe 20.

Prior to 0 minutes, in the hydrogen tank filling time interval as shown on the horizontal axis in FIGS. 4 and 5, i.e., before the hydrogen tank 14 begins being filled with hydrogen, both the first valve 34 and the second valve 36 are closed. At this time, the hydrogen supplied from the high-pressure hydrogen storage tank 12 is depressurized to 35 MPa of a predetermined value by the regulator 32, and fills the portion of the first hydrogen supply pipe 18 that lies upstream of, i.e., on the primary side of, the first valve 34, and also fills the portion of the second hydrogen supply pipe 20 that lies upstream of, i.e., on the primary side of, the second valve 36. The hydrogen filling the portion of the second hydrogen supply pipe 20 on the primary side of the second valve 36 is cooled to about −120° C. by the cooling means 22.

Then, in the joint region 30, the hydrogen supply pipe 26 on the side of the high-pressure hydrogen storage tank 12 is connected to the supply port 44 of the hydrogen tank 14, so that the hydrogen tank 14 can be filled with hydrogen from the high-pressure hydrogen storage tank 12. At the same time, the conducting wire 48 and the conducting wire 46 are connected to each other, thereby electrically connecting the internal tank temperature measuring means 42 disposed inside the hydrogen tank 14 to the control means 38.

Temperature information, representing the atmospheric temperature (ambient temperature) T1 as measured by the atmospheric temperature measuring means 40, and the temperature T2 in the hydrogen tank 14 as measured by the internal tank temperature measuring means 42, begins being transmitted to the control means 38. The temperature information is monitored by the control means 38. The control means 38 calculates a difference $\Delta T$ ($\Delta T = T2 - T1$) between the temperature T2 in the hydrogen tank 14 and the atmospheric temperature T1, and opens or closes the first valve 34 and the second valve 36 based on changes in the difference $\Delta T$, in a process to be described later. The path of hydrogen supplied from the high-pressure hydrogen storage tank 12 to the hydrogen tank 14 is thus controlled to quickly switch between the first hydrogen supply pipe 18 and the second hydrogen supply pipe 20.

Normally, when the hydrogen tank 14 is filled with hydrogen, changes in the atmospheric temperature are much smaller than changes in temperature that occur inside the hydrogen tank 14. Consequently, the atmospheric temperature measuring means 40 may be dispensed with, and the first valve 34 and the second valve 36 may be opened and closed depending solely on temperature changes inside the hydrogen tank 14, in order to perform switching between the first hydrogen supply pipe 18 and the second hydrogen supply pipe 20, so that the temperature in the hydrogen tank 14 will be brought to and remain within a predetermined temperature range. Alternatively, a different preset target temperature T3 may be used instead of the atmospheric temperature T1, and the difference $\Delta T2$ ($\Delta T2 = T2 - T3$) may be used instead of the previously described difference $\Delta T$. In this case, the first valve 34 and the second valve 36 may be opened and closed to perform switching between the first hydrogen supply pipe 18 and the second hydrogen supply pipe 20, so that the difference $\Delta T2$ will be brought to and remain within a predetermined temperature range.

The first hydrogen tank filling method shall be described below with reference to FIG. 4.

In order to begin filling the hydrogen tank 14 with hydrogen, the second valve 36 is opened earlier than the first valve 34, so as to fill the hydrogen tank 14 initially with cooled hydrogen from the second hydrogen supply pipe 20. When the hydrogen at the atmospheric temperature is introduced into the hydrogen tank 14, the temperature inside the hydrogen tank 14 rises significantly. Therefore, according to the first hydrogen tank filling method, cooled hydrogen is firstly introduced into the hydrogen tank 14 in order to prevent the temperature inside the hydrogen tank 14 from rising immediately after the hydrogen tank 14 has begun to be filled.

Specifically, the second valve 36 is opened while the first valve 34 is closed, thereby to start introducing cooled hydrogen inside the second hydrogen supply pipe 20 into the hydrogen tank 14.

The temperature in the hydrogen tank 14 is gradually lowered until the difference $\Delta T$ between the temperature T2 in the hydrogen tank 14 and the atmospheric temperature T1 becomes −10° C. or lower, whereupon the control means 38 closes the second valve 36 while simultaneously opening the first valve 34. Hydrogen at the atmospheric temperature immediately starts to be introduced from the first hydrogen supply pipe 18 into the hydrogen tank 14. Stated otherwise, the path of hydrogen supplied from the high-pressure hydrogen storage tank 12 to the hydrogen tank 14 is controlled by the control means 38, so as to switch quickly from the second hydrogen supply pipe 20 to the first hydrogen supply pipe 18.

Thereafter, the temperature in the hydrogen tank 14 gradually increases until the difference $\Delta T$ becomes +10° C. or higher, whereupon the control means 38 closes the first valve 34 while simultaneously opening the second valve 36. Cooled hydrogen inside the second hydrogen supply pipe 20 immediately starts to be introduced into the hydrogen tank 14. Subsequently, selective switching is performed between the first hydrogen supply pipe 18 and the second hydrogen supply pipe 20 by opening and closing the first valve 34 and the second valve 36, until the hydrogen pressure in the hydrogen tank 14 reaches 35 MPa.

The second hydrogen tank filling method shall be described below with reference to FIG. 5.

In order to begin filling the hydrogen tank 14 with hydrogen, the first valve 34 is opened earlier than the second valve 36, in reverse order of the first method, so as to fill the hydrogen tank 14 initially with hydrogen, which is substantially at the atmospheric temperature, from the first hydrogen supply pipe 18. According to the second hydrogen tank filling method, it is difficult to prevent the temperature inside the hydrogen tank 14 from rising immediately after the hydrogen tank 14 has begun to be filled. However, the second hydrogen tank filling method is effective when the hydrogen tank 14 is very cold at the time it is filled, for example, during the winter season and in cold climates where the atmospheric temperature is low. The second hydrogen tank filling method is similar to the first hydrogen tank filling method, except that the first and second valves 34, 36 are controlled in a reverse fashion when the hydrogen tank 14 starts to be filled with hydrogen, and hence, the second hydrogen tank filling method shall not be described in detail below.

According to the second hydrogen tank filling method, initially, the first valve 34 is opened while the second valve 36 is closed, so as to begin introducing hydrogen substantially at the atmospheric temperature from the first hydrogen supply pipe 18 into the hydrogen tank 14. Thereafter, as with the first hydrogen tank filling method, when the difference $\Delta T$ becomes either −10° C. or lower or +10° C. or higher, the control means 38 selectively opens and closes the first valve 34 and the second valve 36. In this manner, the path of hydrogen supplied from the high-pressure hydrogen storage tank 12 to the hydrogen tank 14 is controlled, so as to switch quickly between the first hydrogen supply pipe 18 and the second hydrogen supply pipe 20.

According to the present invention, as described above, the first valve 34 and the second valve 36 are opened and closed based on changes in the difference ΔT between the temperature T2 inside the hydrogen tank 14 and the atmospheric temperature T1. The path of hydrogen supplied from the high-pressure hydrogen storage tank 12 to the hydrogen tank 14 is thus controlled to switch quickly between the first hydrogen supply pipe 18 and the second hydrogen supply pipe 20, so that temperature changes inside the hydrogen tank 14 are suppressed. The interior of the hydrogen tank 14 immediately after completion of filling the hydrogen tank 14 is held substantially at the atmospheric temperature, while the hydrogen tank 14 is filled with a sufficient amount of hydrogen. For example, according to the first and second hydrogen tank filling methods, when the difference ΔT between the temperature T2 inside the hydrogen tank 14 and the atmospheric temperature T1 is controlled so as to fall within a predetermined temperature range, i.e., from −10° C. to +10° C., the hydrogen pressure inside the hydrogen tank 14 immediately after completion of filling the hydrogen tank 14 can be 34 MPa or higher, which is 97% or more of the hydrogen pressure of 35 MPa at the atmospheric temperature while the hydrogen tank 14 is being filled with hydrogen.

Preferred embodiments of the present invention have been described above. However, the present invention is not limited to the illustrated embodiments, and various changes and modifications may be made to the embodiments without departing from the scope of the invention.

Examples of such changes and modifications shall be described below.

Application of the first and second hydrogen tank filling methods may depend on the atmospheric temperature (ambient temperature), which is measured by the atmospheric temperature measuring means 40. Specifically, the first and second hydrogen tank filling methods may selectively be applied such that the second hydrogen tank filling method is performed if the atmospheric temperature is below a preset temperature, and the first hydrogen tank filling method is performed otherwise.

If the first valve 34 and the second valve 36 are opened and closed based on the target temperature T3 and the temperature difference ΔT2, then the target temperature T3 may be set to a constant value. Such a modified hydrogen tank filling method can be applied to a commercial hydrogen tank filling station (not shown) for filling the hydrogen tank 14. Based on the modified hydrogen tank filling method, a commercial hydrogen tank filling station can be used to fill the hydrogen tank 14 with a constant amount of hydrogen, irrespective of changes in the atmospheric temperature during summer and winter seasons.

In the illustrated embodiments, the first hydrogen supply pipe 18 functions as a first hydrogen storage unit for supplying hydrogen at the atmospheric temperature to the hydrogen tank 14, whereas the second hydrogen supply pipe 20 functions as a second hydrogen storage unit for supplying hydrogen at a low temperature to the hydrogen tank 14. A plurality of high-pressure hydrogen storage tanks 12 may be employed, such that one of the high-pressure hydrogen storage tanks 12 functions as a first hydrogen storage unit, whereas another one of the high-pressure hydrogen storage tanks 12 functions as a second hydrogen storage unit.

Although certain preferred embodiments of the present invention have been described above, it should be understood that various changes and modifications may be made to such embodiments without departing from the scope of the invention as set forth in the appended claims.

What is claimed is:

1. An apparatus for filling a hydrogen tank with hydrogen, comprising:

first and second hydrogen tanks spaced apart from each other;

a first hydrogen supply pipe in fluid communication at one end with the first hydrogen tank and in fluid communication at an opposed end with the second hydrogen tank for supplying hydrogen from the first hydrogen tank to said second hydrogen tank;

a second hydrogen supply pipe in fluid communication at one end with the first hydrogen tank and in fluid communication at an opposed end with the second hydrogen tank for supplying hydrogen from the first hydrogen tank to said second hydrogen tank;

a cooling unit directly coupled to the second hydrogen supply pipe for cooling the hydrogen therein prior to introduction to the second hydrogen tank, wherein the hydrogen in the first hydrogen supply pipe has a temperature higher than the temperature of the hydrogen in the second hydrogen supply pipe after the hydrogen in the second hydrogen supply pipe has been cooled by the cooling unit;

temperature measuring means for measuring a temperature inside said second hydrogen tank;

switching means coupled to the first and second hydrogen supply pipes for selectively supplying hydrogen from the first hydrogen tank to the second hydrogen tank and through the first and second supply pipes; and control means coupled to said switching means and to said temperature measuring means for controlling said switching means in response to the temperature inside said second hydrogen tank as measured by said temperature measuring means to supply hydrogen to said second hydrogen tank from at least one of said first and second pipes so as to selectively adjust the temperature of the hydrogen within the second hydrogen tank.

2. An apparatus according to claim 1, further comprising:
   thermal insulating means for thermally insulating a portion of said second hydrogen supply pipe, which extends from said cooling means to said hydrogen tank.

3. An apparatus according to claim 1, wherein said switching means comprises:

a first valve connected to said first hydrogen supply pipe; and a second valve connected to said second hydrogen supply pipe at an outlet of said cooling means, wherein said control means opens and closes said first valve and said second valve.

4. An apparatus according to claim 1, wherein said first hydrogen supply pipe and said second hydrogen supply pipe are connected to each other at ends thereof that are connected to said hydrogen tank, such that said first hydrogen supply pipe and said second hydrogen supply pipe have a common outlet at said ends thereof.

5. An apparatus according to claim 1, wherein said first hydrogen supply pipe and said second hydrogen supply pipe are combined with each other by a covering sleeve.

* * * * *